(12) United States Patent
Markley et al.

(10) Patent No.: US 7,479,077 B2
(45) Date of Patent: Jan. 20, 2009

(54) PIVOTING MECHANICAL TENSIONER WITH COMPLIANT BLADE SPRING

(75) Inventors: George L. Markley, Montour Falls, NY (US); John T. Crockett, II, Etna, NY (US); Timothy A. Turner, Johnson City, NY (US); Mark M. Wigsten, Lansing, NY (US)

(73) Assignee: BorgWarner Inc., Auburn Hills, MI (US)

( * ) Notice: Subject to any disclaimer, the term of this patent is extended or adjusted under 35 U.S.C. 154(b) by 766 days.

(21) Appl. No.: 11/168,049

(22) Filed: Jun. 28, 2005

(65) Prior Publication Data
US 2006/0293134 A1    Dec. 28, 2006

(51) Int. Cl.
*F16H 7/08*   (2006.01)
*F16H 7/18*   (2006.01)
*F16H 7/22*   (2006.01)

(52) U.S. Cl. .................. 474/111; 474/101; 474/109; 474/140; 474/122; 474/110

(58) Field of Classification Search ................. 474/111, 474/101, 109, 140, 122, 112, 119, 128, 129
See application file for complete search history.

(56) References Cited

U.S. PATENT DOCUMENTS

| | | | |
|---|---|---|---|
| 0,866,702 A | 9/1907 | Weeks | |
| 1,777,527 A | 10/1930 | Morse | |
| 1,988,421 A | 9/1935 | McCann et al. | |
| 2,191,946 A | 2/1940 | Weller | |
| 2,210,279 A | 8/1940 | Catland | 308/198 |
| 2,261,316 A | 11/1941 | Weller | 74/242.11 |
| 4,193,314 A | 3/1980 | Horner et al. | 74/242.5 |
| 4,395,251 A | 7/1983 | King et al. | 474/111 |
| 5,180,340 A | 1/1993 | Vahabzadeh et al. | |
| 5,266,066 A | 11/1993 | White | 474/111 |
| 5,286,234 A | 2/1994 | Young | 474/111 |
| 5,445,568 A | 8/1995 | Fukuzawa et al. | |
| 5,551,926 A | 9/1996 | Ebert et al. | 474/101 |
| 5,797,818 A | 8/1998 | Young | 474/111 |
| 5,853,341 A | 12/1998 | Wigsten | |

(Continued)

FOREIGN PATENT DOCUMENTS

EP   0055166   6/1982

(Continued)

*Primary Examiner*—Thu Nguyen
*Assistant Examiner*—Henry Liu
(74) *Attorney, Agent, or Firm*—Brown & Michaels, PC

(57) ABSTRACT

A tensioner for imparting tension to a chain having a body, a resilient chain guide element, at least one blade spring, and at least one bracket. The body of the tensioner has a surface with a profile of the path of a new chain and a groove found longitudinally along the length of the surface. The resilient chain guide element, on the surface of the body has a chain contact surface and two ends wrapped around the ends of the body, with the chain guide being sufficiently larger than the body, such that the chain contact surface is capable of being biased away from the body. The blade spring is present in the groove with its end in the containments means of the groove, biasing the chain guide out and away from the body. At least one bracket is fixedly attached to the body and has a pivot.

6 Claims, 18 Drawing Sheets

U.S. PATENT DOCUMENTS

| | | | |
|---|---|---|---|
| 5,967,921 A | 10/1999 | Simpson et al. | |
| 5,967,922 A | 10/1999 | Ullein et al. | |
| 5,989,138 A | 11/1999 | Capucci | 474/109 |
| 6,129,644 A | 10/2000 | Inoue | 474/110 |
| 6,155,941 A | 12/2000 | White et al. | |
| 6,312,353 B1 | 11/2001 | Oba | |
| 6,322,469 B1 | 11/2001 | Markley | |
| 6,322,470 B1 * | 11/2001 | Markley et al. | 474/111 |
| 6,447,414 B1 | 9/2002 | White et al. | |
| 6,478,703 B2 | 11/2002 | Suzuki | 474/101 |
| 6,524,202 B1 | 2/2003 | Tada et al. | 474/109 |
| 6,554,728 B2 | 4/2003 | Young, Jr. et al. | 474/140 |
| 6,572,502 B1 | 6/2003 | Young et al. | 474/111 |
| 6,599,209 B1 | 7/2003 | Ullein et al. | 474/111 |
| 6,612,952 B1 * | 9/2003 | Simpson et al. | 474/111 |
| 6,623,391 B2 * | 9/2003 | Young et al. | 474/111 |
| 6,849,015 B2 | 2/2005 | Markley et al. | 474/111 |
| 2002/0042315 A1 * | 4/2002 | Poiret | 474/140 |
| 2002/0061799 A1 | 5/2002 | Young | 474/111 |

FOREIGN PATENT DOCUMENTS

| | | |
|---|---|---|
| EP | 1096173 | 5/2001 |
| GB | 505746 | 5/1939 |
| JP | 57-134055 | 8/1982 |
| JP | 57134055 | 8/1982 |
| JP | 63006262 | 1/1988 |
| JP | 10184381 | 7/1998 |
| JP | 10274298 | 10/1998 |
| JP | 2002120786 | 4/2002 |
| JP | 2004278621 | 10/2004 |

\* cited by examiner

PRIOR ART

PIVOTING MECHANICAL TENSIONER WITH COMPLIANT BLADE SPRING

REFERENCE TO RELATED APPLICATIONS

This application is related to an application filed simultaneously, entitled "MECHANICAL CHAIN TENSIONER WITH COMPLIANT BLADE SPRING". The aforementioned application is hereby incorporated herein by reference. The aforementioned application is hereby incorporated herein by reference. The application is also related to application Ser. No. 10/984,450 filed Nov. 9, 2004, entitled "COMPLIANT SNUBBER" and application Ser. No. 10/692,182 filed Nov. 9, 2004, entitled "Complaint Chain Guide With Blade Spring." The aforementioned applications are hereby incorporated by reference.

BACKGROUND OF THE INVENTION

1. Field of the Invention

The invention pertains to the field of variable valve timing mechanisms. More particularly, the invention pertains to an actuator and control method for a variable valve timing mechanism.

2. Description of Related Art

A tensioning device, such as a hydraulic tensioner, is used as a control device for a power transmission chain, or similar power transmission devices, as the chain travels between a plurality of sprockets. In this device, the chain transmits power from a driving shaft to a driven shaft, so that part of the chain is slack and part of the chain is tight. Generally, it is important to impart and maintain a certain degree of tension in the chain to prevent noise, slippage, or the unmeshing of teeth in the case of a toothed chain. Prevention of such slippage is particularly important in the case of a chain driven camshaft in an internal combustion engine because jumping of teeth will throw off the camshaft timing, possibly causing damage or rendering the engine inoperative.

However, in the harsh environment of an internal combustion engine, various factors can cause fluctuations in the chain tension. For instance, wide variations in temperature and thermal expansion coefficients among the various parts of the engine can cause the chain tension to vary between excessively high or low levels. During prolonged use, wear to the components of the power transmission system can cause a decrease in chain tension. In addition, camshaft and crankshaft induced torsional vibrations cause considerable variations in chain tensions. Reverse rotation of an engine, occurring for example in stopping or in failed attempts at starting, can also cause fluctuations in chain tension. For these reasons, a mechanism is desired to remove excessive tensioning forces on the tight side of the chain and to ensure the necessary tension on the slack side of the chain.

Hydraulic tensioners are a common method of maintaining proper chain tension. In general, these mechanisms employ a lever arm that pushes against the chain on the slack side of the power transmission system. This lever arm must push toward the chain, tightening the chain when the chain is slack, and must be very rigid when the chain tightens.

To accomplish this result, a hydraulic tensioner 1, as shown in prior art FIG. 1, typically comprises a rod or cylinder as a piston 2, which is biased in the direction of the chain by a tensioner spring 3. The piston 2 is housed within a cylindrical housing 5, having an interior space which is open at the end facing the chain and closed at the other end. The interior space of the housing contains a pressure chamber 4 in connection with a reservoir or exterior source of hydraulic fluid pressure. The pressure chamber 4 is typically formed between the housing 5 and the piston 2, and it expands or contracts when the piston 2 moves within the housing 5.

Typically, valves are employed to regulate the flow of fluid into and out of the pressure chamber. For instance, an inlet check valve 6 typically includes a ball-check valve that opens to permit fluid flow in to the pressure chamber 4 when the pressure inside the chamber has decreased as a result of outward movement of the piston 2. When the pressure in the pressure chamber is high, the inlet check valve closes, preventing fluid from exiting the pressure chamber. The closing of the inlet check valve 6 prevents the piston chamber from contracting, which in turn prevents the piston from retracting, achieving a so-called "no-return" function.

Many tensioners also employ a pressure relief mechanism that allows fluid to exit the pressure chamber when the pressure in the chamber is high, thus allowing the piston to retract in response to rapid increases in chain tension. In some tensioners, the pressure relief mechanism is a spring biased check valve. The check valve opens when the pressure exceeds a certain pressure point. Some tensioners may employ a valve which performs both the inlet check function as well as the pressure relief function.

Other mechanisms employ a restricted path through which fluid may exit the fluid chamber, such that the volume of flow exiting the fluid chamber is minimal unless the pressure in the fluid chamber is great. For instance, a restricted path may be provided through the clearance between the piston and bore, through a vent tube in the protruding end of the piston, or through a vent member between the fluid chamber and the fluid reservoir.

A hydraulic tensioner as used with a tensioner arm or shoe is shown in Simpson et al., U.S. Pat. No. 5,967,921, incorporated herein by reference. Hydraulic chain tensioners typically have a plunger slidably fitted into a chamber and biased outward by a spring to provide tension to the chain. A lever, arm or shoe is often used at the end of the plunger to assist in the tensioning of the chain. The hydraulic pressure from an external source, such as an oil pump or the like, flows into the chamber through passages formed in the housing. The plunger is moved outward against the arm by the combined efforts of the hydraulic pressure and the spring force.

When the plunger tends to move in a reverse direction (inward) away from the chain, typically a check valve is provided to restrict the flow of fluid from the chamber. In such a fashion, the tensioner achieves a so-called no-return function, i.e., movements of the plunger are easy in one direction (outward) but difficult in the reverse direction.

Blade tensioners are tensioners that are commonly used to control a chain or belt where load fluctuations are not so severe as to over flex the spring or springs. A ratchet with backlash is added to tensioners to limit the effective backward or untensioned travel of a tensioning device.

Prior art FIG. 2 shows an example of a blade tensioner. The conventional blade tensioner 110 includes a blade shoe 111 made of resin having a curved chain sliding face and numerous blade springs 121, preferably made of metallic material. The blade springs 121 are arranged in layers on the opposite side of the blade shoe 111 from the chain sliding face, and provide spring force to the blade shoe 111. The ends of each spring-shaped blade spring 121 are inserted in the indented portions 114 and 115, which are formed in the distal portion 112 and proximal portion 113 of the blade shoe 111, respectively.

A bracket 117 is provided for mounting the blade tensioner 110 in an engine. Holes 118 and 119 are formed in the bracket 117, and mounting bolts are inserted into these holes 118 and 119. A sliding face 116 contacts the distal portion of the blade shoe 111 and permits sliding. The slide face 116 is formed on the distal portion of the bracket 117. A pin 120 supports the proximal portion 113 of the blade shoe 111 so that it may move in either direction. The pin 120 is secured on the bracket 117.

FIG. 3 shows a chain tensioning device that has a pair of arms 202, 203 which are joined by a pivot 204. The arms 202, 203 are urged apart so that arm 203 applies tensioning force to a chain (not shown) by means of a spring 206 loaded cam block 205. To prevent collapse of arm 203 during load reversals of the chain, a catch disc 209 and rod are arranged to prevent return movement of the spring loaded cam block 205.

FIG. 4 shows an example of a tensioner that uses a ratchet device. The ratchet tensioner 301 comprises a tensioner housing 307 having a hole 312 for receiving a plunger 308 and a ratchet pawl 317 pivoted by a shaft 316 to the tensioner housing 307 and biased by a ratchet spring 318. The plunger 308 has teeth on one outer side that engage the ratchet pawl 317. The plunger 308 is biased out of the hole 312 to contact the tension lever 310 by fluid in the hollow section 313 and by the plunger spring 314. The tensioner lever 310 pivots on support shaft 309 and has a shoe surface 311 that contacts and applies tension to the slack side of the timing chain 306 wrapped around the camshaft 304 and its sprocket 305 and the crankshaft 302 and its sprocket 303. The plunger's 308 movement in and out of the hole 312 is limited by its teeth and the ratchet pawl 317 that engage them.

FIG. 5 shows a tensioning device of U.S. Pat. No. 6,599,209. The tensioning device 421 includes a one piece supporting body 422 with interconnecting sections 424 in the shape of an open honeycomb joined to a tensioning track 423. The tensioning track 423 is elastically supported by coil spring 25. Mounting holes 420 are used to fixedly mount the tensioner 421. In alternate embodiments shown in prior art FIGS. 6a and 6b, a pair of tensioning tracks 406 are joined by rib like interconnecting sections 407 to form one piece. Interconnecting sections 407 are elastically deformable and have angled sections 408. Between the tensioner tracks 406 and the supporting body (not shown) are either a single leaf spring 409 or a leaf spring packet 409a. One of disadvantages of the tensioning device of U.S. Pat. No. 6,599,209 is the spring only tensions the center of the tensioning track and not along the entire face of the tensioner. Another disadvantage is the assembly required to place the spring within the supporting body, since the tensioner is one piece.

FIG. 7 shows the tensioner of U.S. Pat. No. 6,849,015. A shoe 533 is attached to an arm 534 and is positioned outside of the slack side of the chain. The tensioner arm 534 applies tension to the chain when moved in the direction marked by arrow 539. The arm 534 and the shoe 533 are attached by a fixed pin 538 to a tensioner pivot arm 531. The tensioner pivot arm 531 has a pivot 532. Tensioning occurs when a force is applied at point 535 in the direction indicated by arrow 536. Excessive reverse rotation of the tensioner pivot arm 531 is limited by a ratchet feature.

SUMMARY OF THE INVENTION

A tensioner for imparting tension to a chain having a body, a resilient chain guide element, at least one blade spring, and at least one bracket. The body of the tensioner has a surface with a profile of the path of a new chain and a groove found longitudinally along the length of the surface. The resilient chain guide element, on the surface of the body has a chain contact surface and two ends wrapped around the ends of the body, with the chain guide being sufficiently larger than the body, such that the chain contact surface is capable of being biased away from the body. The blade spring is present in the groove with its end in the containment means of the groove, biasing the chain guide out and away from the body. At least one bracket is fixedly attached to the body and has a pivot. A clearance is present between the ends of the body and the ends of the resilient chain guide.

In an alternative embodiment, a first and a second tensioner are present on the slack strand and the tight strand of the chain. The spring rate of the blade spring in first tensioner may be greater than, less than or equal to the spring rate of the blade spring in the second tensioner.

In another embodiment, the clearance between the ends of the body and the ends of the resilient chain guide of the first tensioner is greater than the clearance between the ends of the body and the ends of the resilient chain guide of the second tensioner.

DETAILED DESCRIPTION OF THE INVENTION

Figure 1:
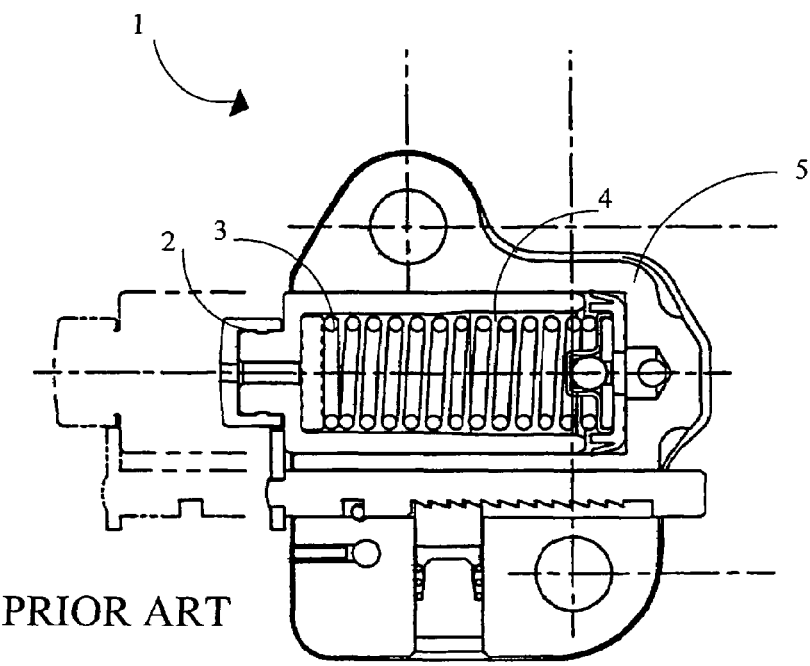
FIG. 1 shows a prior art blade tensioner.
Figure 2:
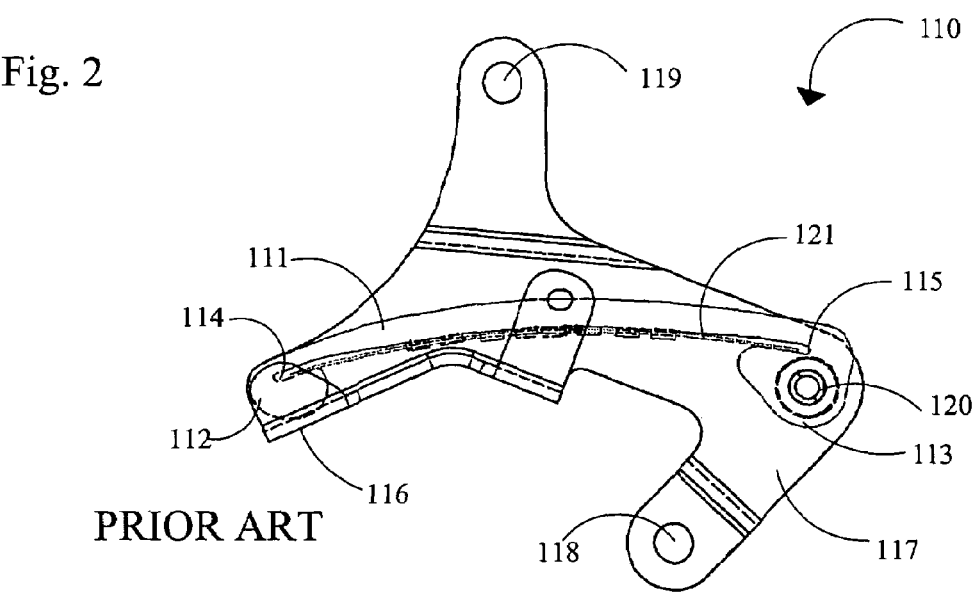
FIG. 2 shows a prior art hydraulic tensioner.
Figure 3:
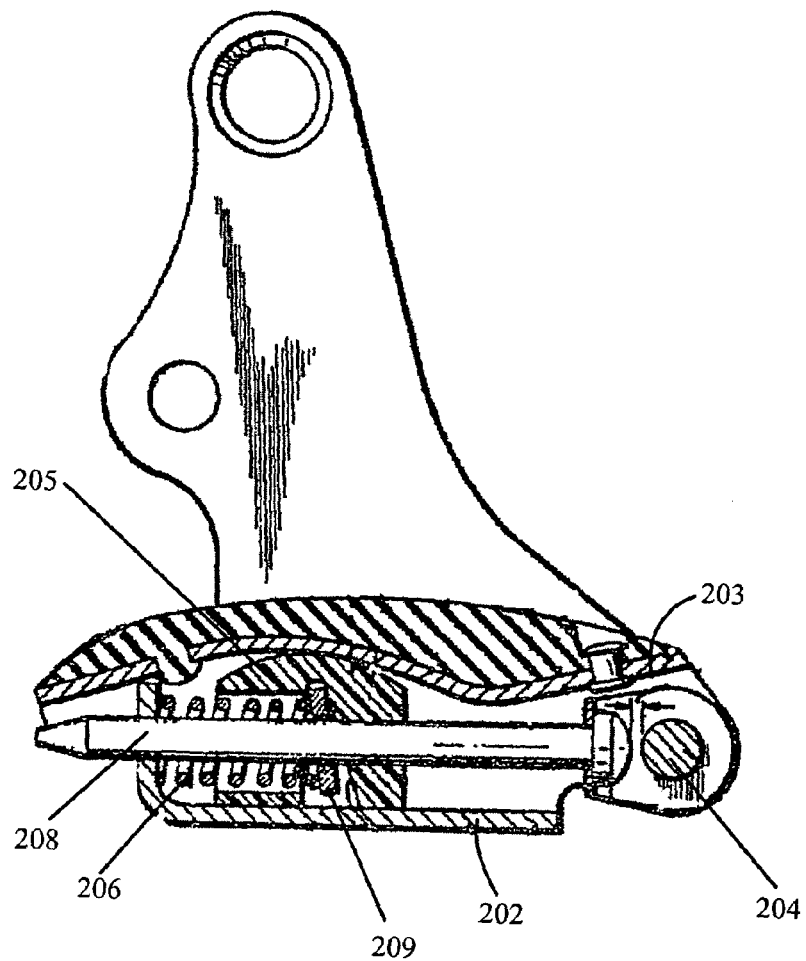
FIG. 3 shows another prior art tensioner.
Figure 4:
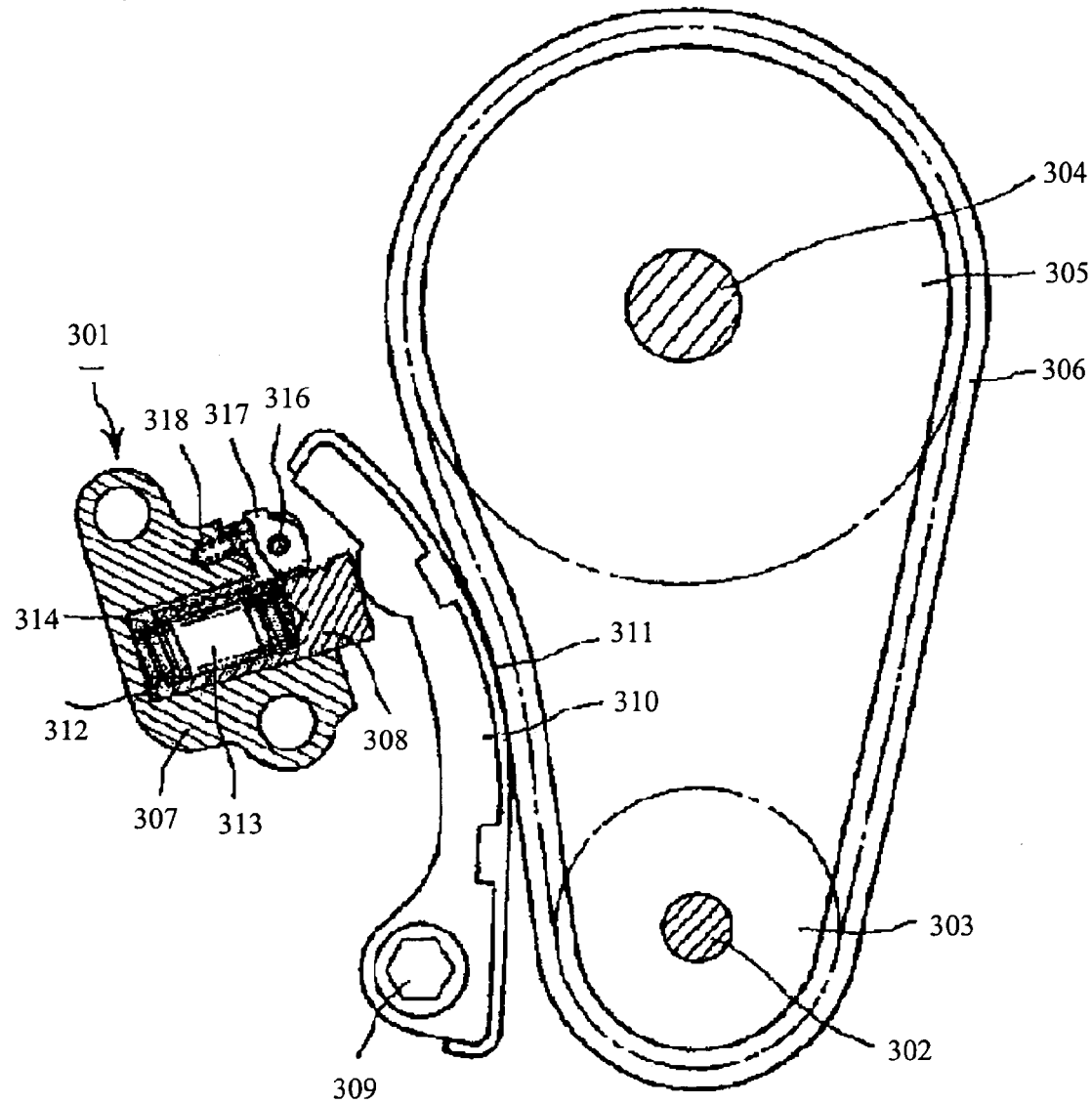
FIG. 4 shows a prior art ratcheting tensioner.
Figure 5:
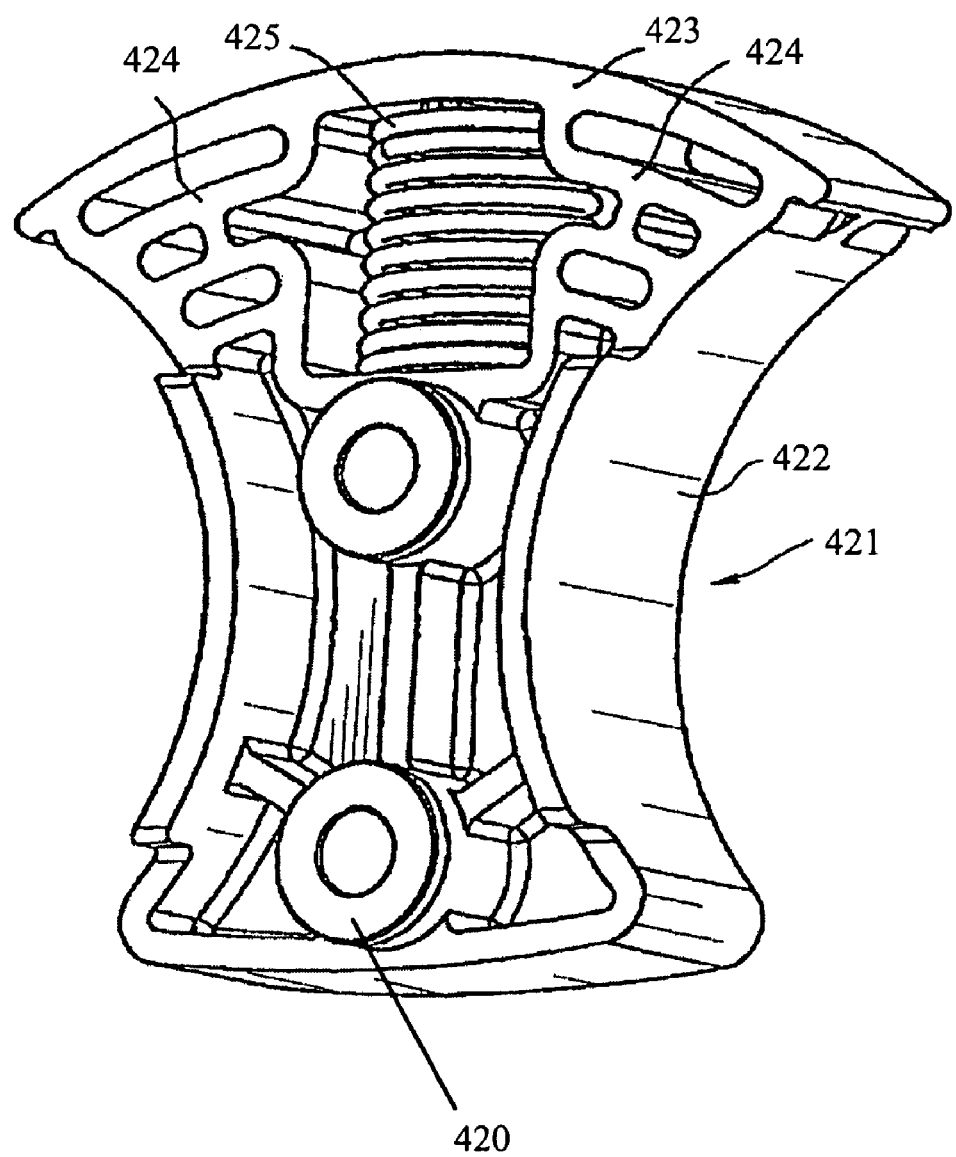
FIG. 5 shows a first embodiment of a one piece prior art tensioner.
Figure 6A:
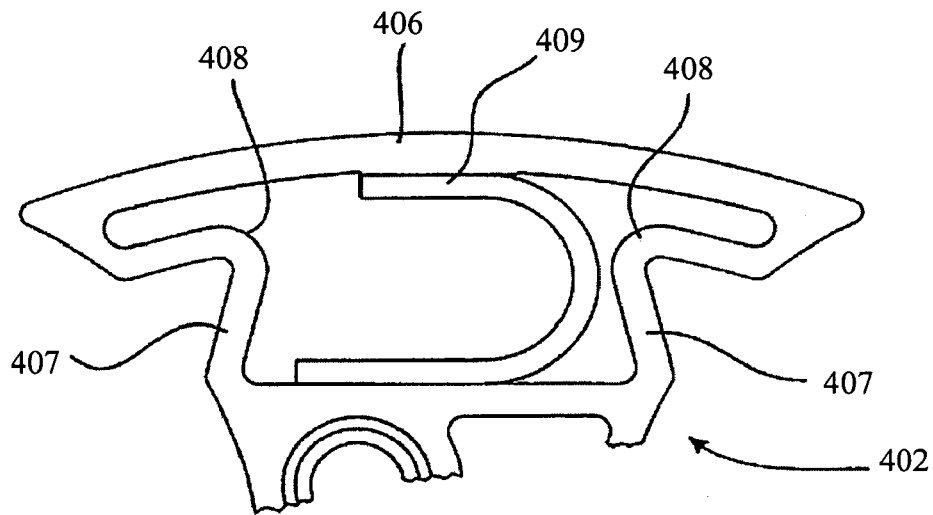
FIG. 6a shows an alternate embodiment of a one piece prior art tensioner.
Figure 6B:
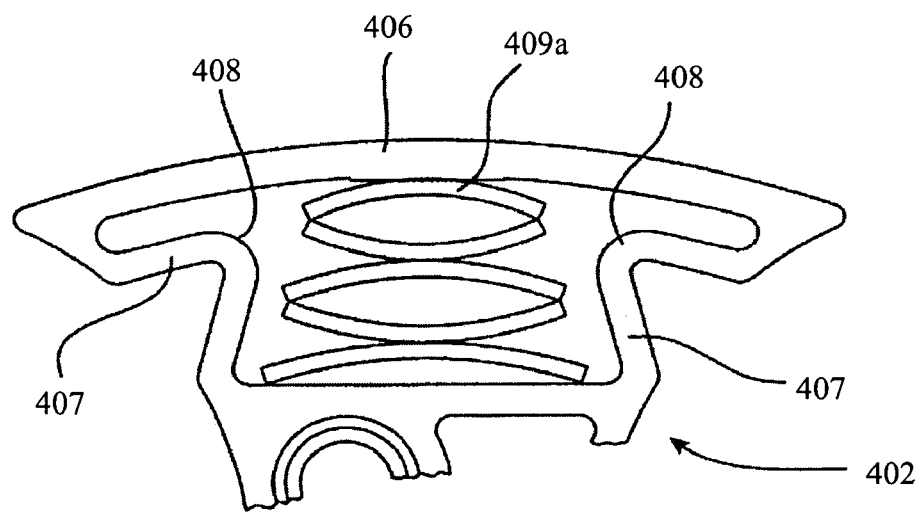
FIG. 6b shows another alternate embodiment of a one piece prior art tensioner.
Figure 7:
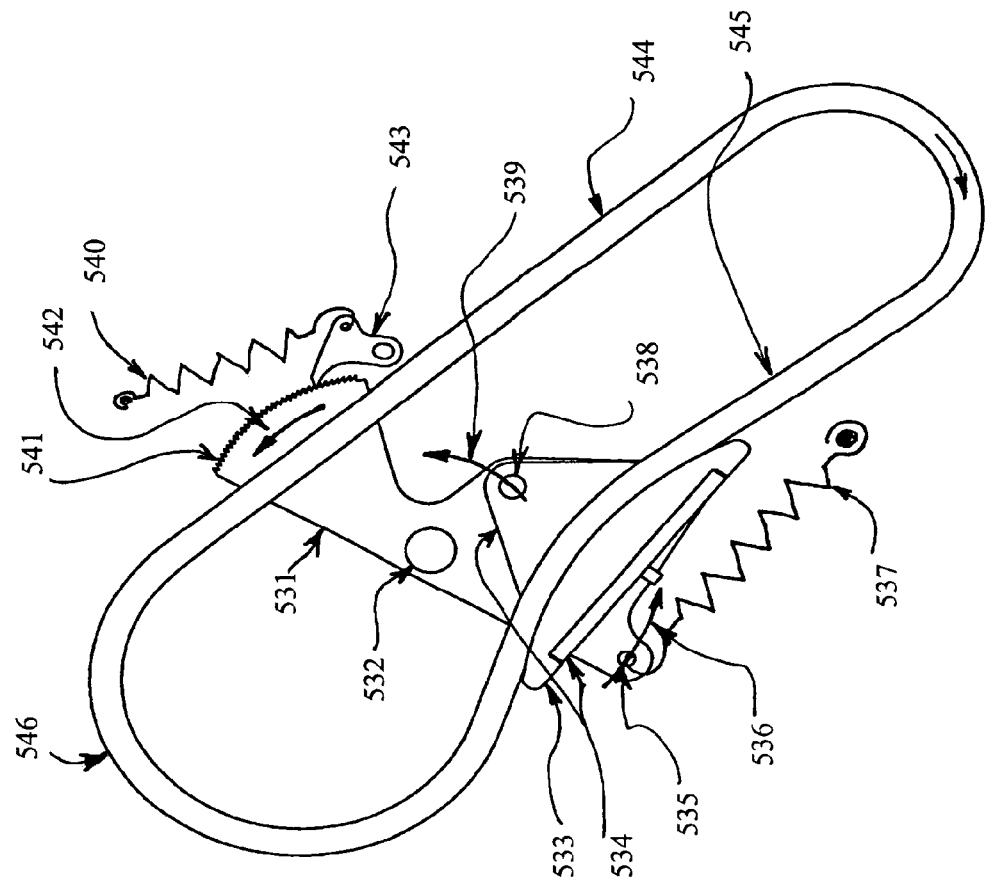
FIG. 7 shows a prior art tensioner.
Figure 8:
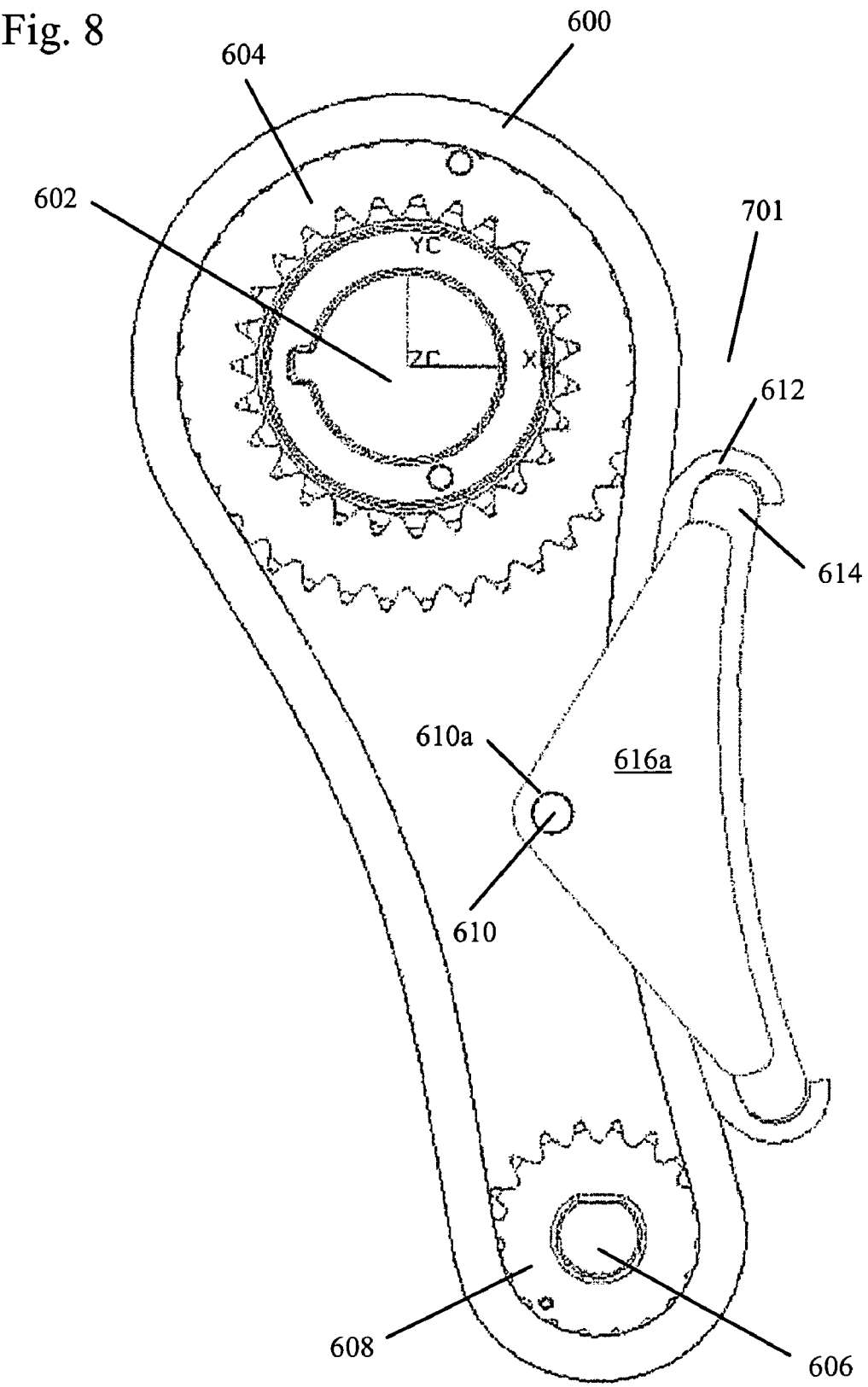
FIG. 8 shows a front view of the tensioner system of the first embodiment.
Figure 9:
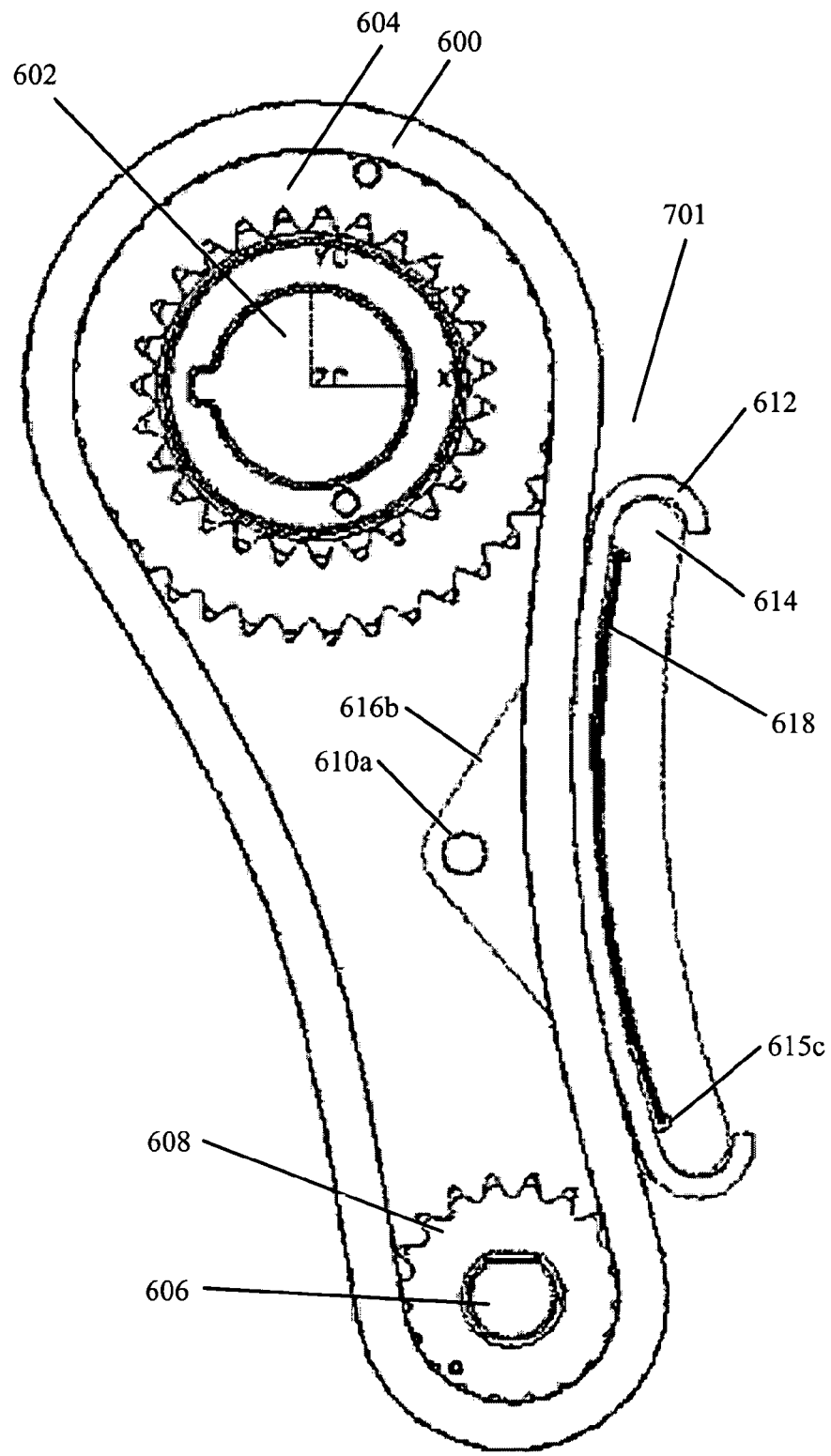
FIG. 9 shows a front view of the tensioner system of the first embodiment with a plate removed and a new chain.
Figure 10:
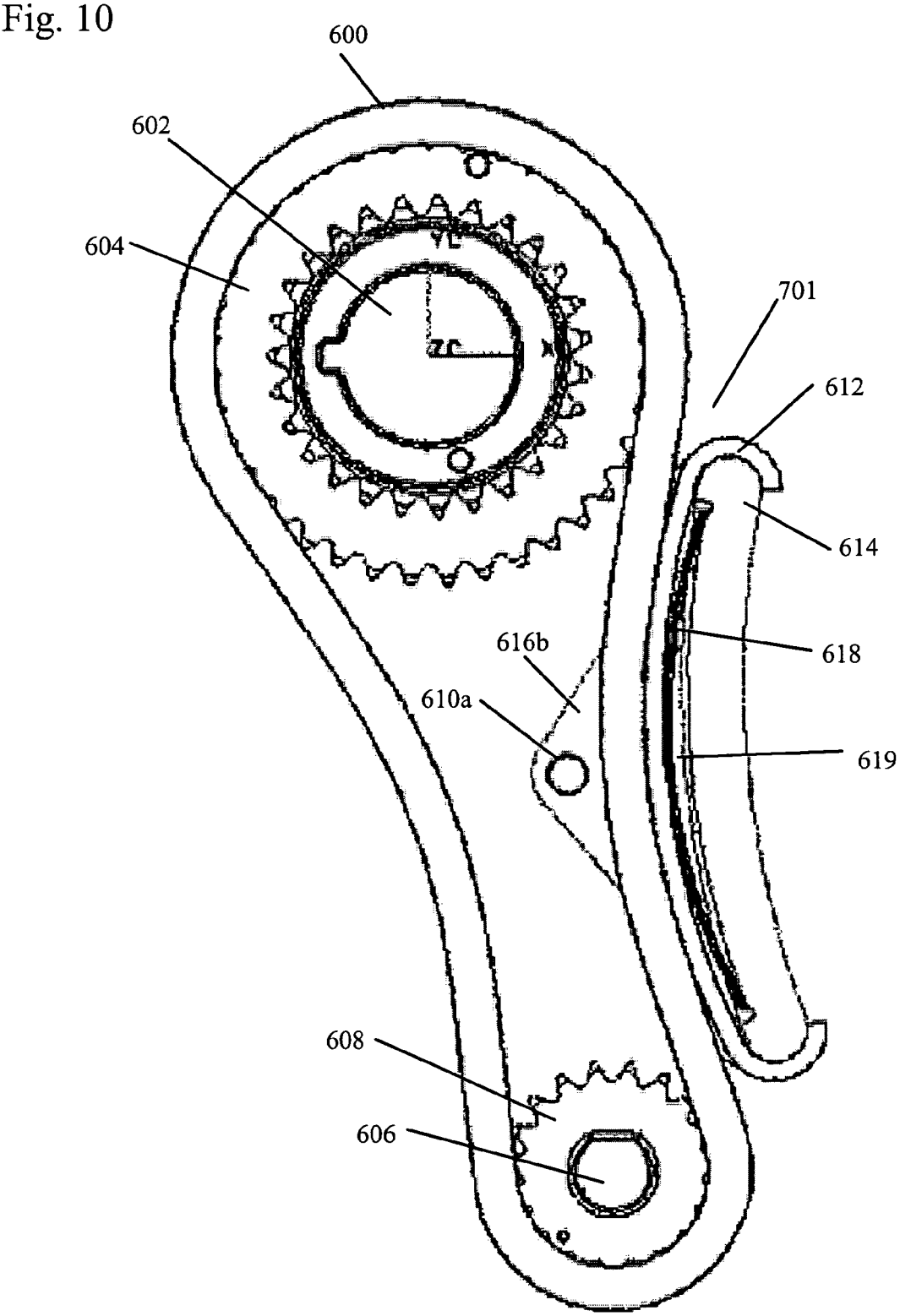
FIG. 10 shows a front view of the tensioner system of the first embodiment with a plate removed and a worn chain.

FIGS. 8 through 10 show the tensioner system of the first embodiment. FIG. 8 shows a chain 600 wrapped around a drive sprocket 608 and driven sprocket 604 on the drive shaft 606 and a driven shaft 602 respectively. On the outside of the slack strand of the chain is a compliant pivoting tensioning device 701.

Referring to FIGS. 13 through 16, the compliant pivoting tensioning device 701 has a pair of bracket face plates 616a, 616b fixedly attached and extending axially outwards from the bracket body 614. The pair of bracket face plates 616a, 616b each preferably have a pivot pin hole 610a, equidistant from the face ends and offset from a line common to both 616a, 616b for receiving pivot pin 610.

The bracket body 614 has a surface 614c with a gently curved profile that is similar to the path of a new chain as controlled by the chain guide element 612. A channel cut groove 615 with sides 615a, a bottom 615b and recessed pockets 615c at either end of the groove 615 is found longitudinally along the length of the surface 614c. At least one blade spring 618, is somewhat flattened and placed in the channel cut groove 615. The blade spring 618 is a rectangle curled lengthwise in its free state and applied mostly uncurled in its assembled state, in the channel cut groove 615, between the bracket body 614 and the chain guide element 612. The recessed pockets 615c at either end of the groove 615 act as containment means and bearing surfaces for the blade spring ends as the blade spring 618 tries to curl into its free state. The blade spring 618 applies a separating force to the underside 612e of chain guide element 612 as the blade spring 618 tries to curl into its free state, forcing the chain guide element 612 out and away from the bracket body 614 and towards the chain 600, forcing the chain guide element 612 to constantly be in contact with the chain strand. The surface 614c of the bracket body 614 acts as a stop for the chain guide element 612 in opposition to excessive chain force. Bracket face plates 616a, 616b are present on either side of the bracket body 614 to aid in maintaining the chain guide element 612 in the "Z" direction when in its extended state, such as with a worn chain. The bracket face plates 616a, 616b are preferably fixedly attached to the bracket body 614, but may be integral to bracket body 614 also.

The chain guide element 612 has a first end 612c and second end 612d joined together by a middle portion that acts as the chain sliding face 612b. The chain sliding face 612b is in sliding contact with the chain 600. Along the chain sliding face 612b of the chain guide element 612 are guides 612a on either side of the face to aid in guiding the chain 600 along the face 612b. The first end 612c and the second end 612d of the chain guide element 612 are curved underneath and around towards the center of the face. The chain guide element 612 is larger than the bracket body and the curved first end 612c and second end 612d of the chain guide element 612 receive the respective first end 614a and second end 614b of the bracket body 614, loosely securing the chain guide element 612 to the bracket body 614. The chain guide element 612 is preferably made of a material that is semi-flexible at a temperature, allowing the chain guide element 612 to conform to the chain 600 and the blade spring 618. A clearance C is present between the first and second end 612c, 612d of the chain guide element 612 and the first and second end 614a, 614b of the bracket body 614. As the blade spring 618 biases the chain guide element 612 out and away from the bracket body 614, the clearance C between the ends 614a, 614b of the bracket body 614 and the ends 612c, 612d of the chain guide element 612 is taken up until the chain guide element 612 can not bow out any further.

In a typical prior art chain drive system a closed loop chain with a slack strand and a tight strand encircles a driving sprocket and a driven sprocket with a distance between the two sprockets. Each of the sprockets accelerates and decelerates independent of each other as part of the internal combustion timing system, while maintaining forward motion. A rigidly fixed guide is usually located on the tight strand of the chain and a tensioner that is at least semi-rigidly fixed is located opposite the fixed guide on the slack strand.

When the driving sprocket accelerates or the driven sprocket decelerates, an energy wave is created in the spanning strand emanating from the sprocket with the decrease in velocity that moves towards the other sprocket. The chain attempts to span the distance between the link of the chain meshed with the initiating sprocket of the energy wave to the other sprocket in the shortest distance possible, a straight line. The energy moves through the free strand of the chain one link at a time until it meets the end of the guide or the tensioner, which is impacted by this energy wave and is forced to absorb it.

As shown in FIG. 8, the compliant tensioning device 701 is placed relative to the slack strand of the chain so that the strand is received between the pair of bracket face plates 616a, 616b and slides on the chain sliding face 612b of the chain guide element 612. The pair of bracket face plates 616a, 616b are preferably oriented so that the pivot pin hole 610a and thus the pivot pin 610 is located between the drive sprocket 608 and the driven sprocket 604, preferably along the chain centerline. The compliant tensioning device 701 pivots about pivot pin 610. The pivot allows the chain guide element end 612c, 612d experiencing the chain wave energy loading to yield by pivoting away from the load until the load is balanced by a similar load on the other end.

Figure 17:
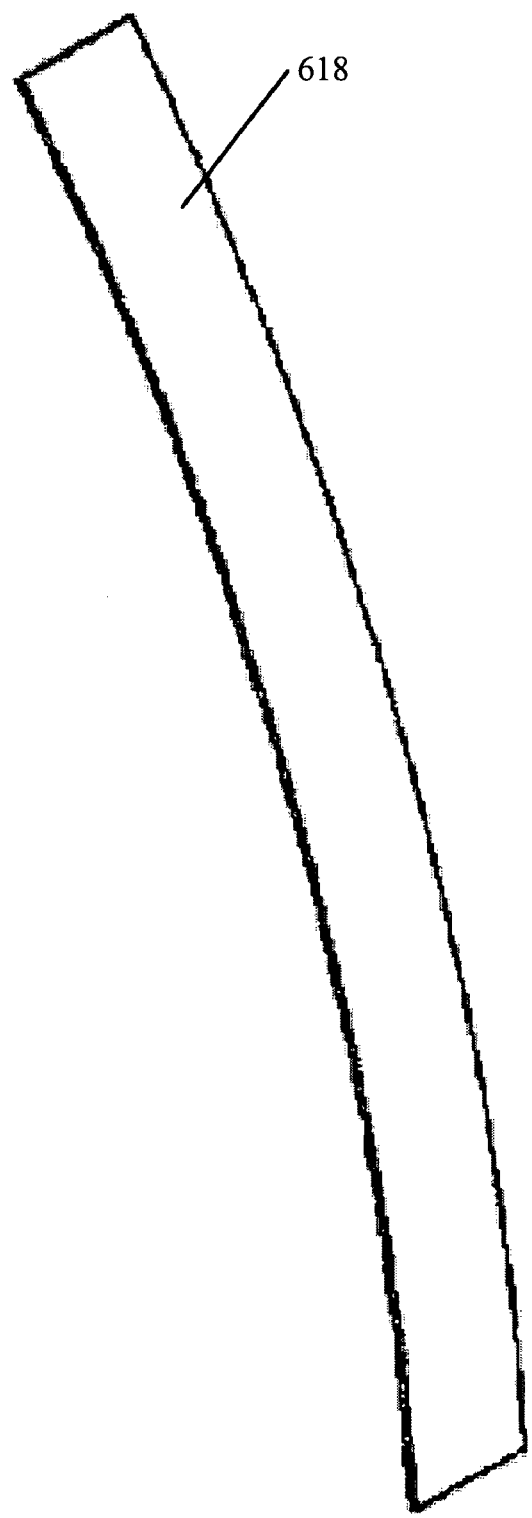
FIG. 17 shows a perspective view of the blade spring for tensioning a new chain.

FIG. 9 shows the compliant tensioning device 701 placed on the slack strand of the chain with one of the bracket face plates 616a removed, showing the chain guide element 612 and the position of the blade spring 618 with a new chain. FIG. 17 shows a blade spring 618 in its free state with more curve than when it is installed in the channel cut groove 615 of the bracket body 614.

Figure 18:
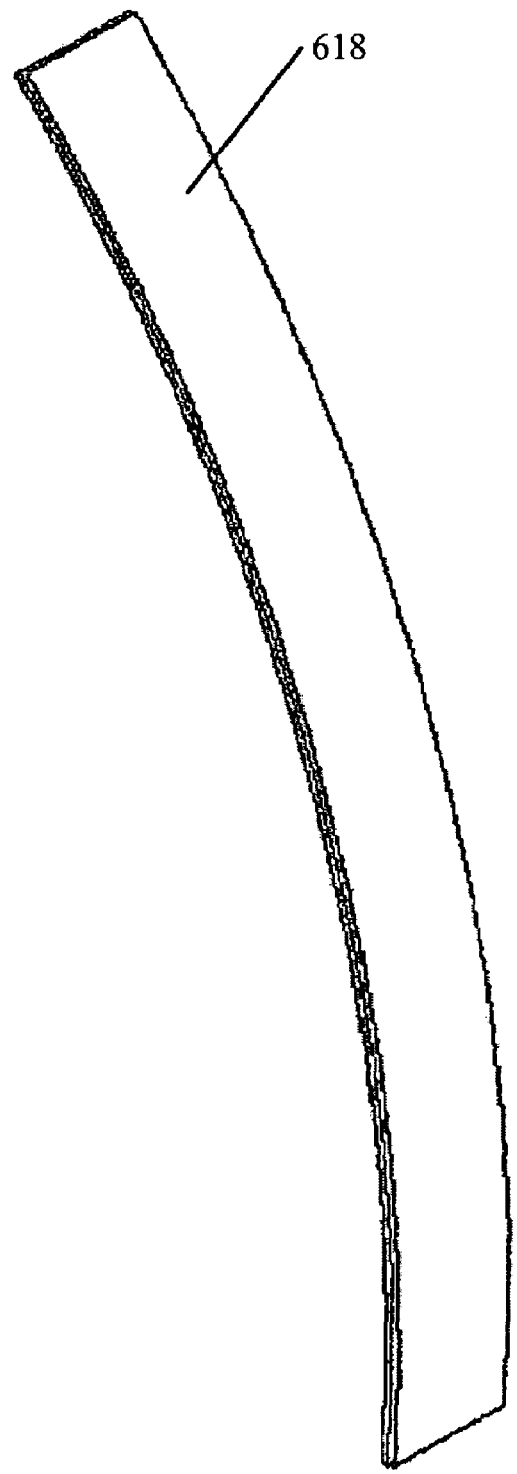
FIG. 18 shows a perspective view of the blade spring for tensioning a worn chain.

FIG. 10 shows the compliant tensioning device 701 placed on the slack strand of the chain with one of the bracket face plates 616a removed, showing the chain guide element 612 and the position of the blade spring with a worn chain. FIG. 18 shows a blade spring 618 as it would be present in the channel cut groove 615 of the bracket body 614. The blade spring 618 with a worn chain is more curved or bowed than a blade spring with a new chain. As the chain wears and elongates, the blade spring becomes more bowed and presses against and biases the chain guide element 612 into contact with the worn chain. A gap 619 is present between the bottom 615b of the channel cut groove 615 and the blade spring 618.

By having a strong spring load that causes the blade spring 618 to attempt to curl from its flattened state, looseness or clearance between the ends of the chain guide element 612 and the bracket body 614, the chain guide element 612 of the compliant tensioning device 701 is always in contact with chain 600, regardless of whether the chain is worn or new, ensuring chain control for the design life of the system.

Figure 11:
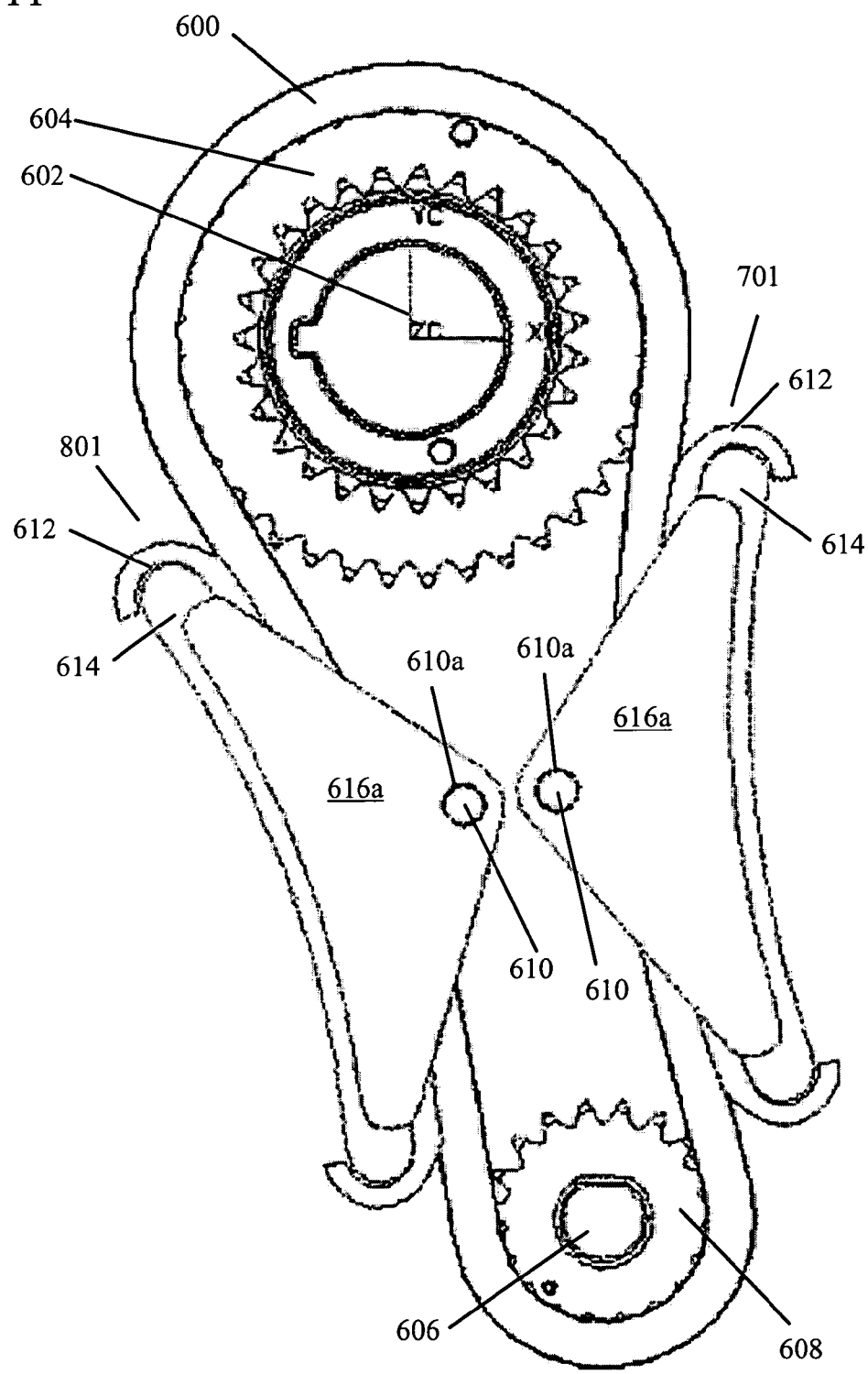
FIG. 11 shows a front view of the tensioner system of the second embodiment tensioning the chain.
Figure 12:
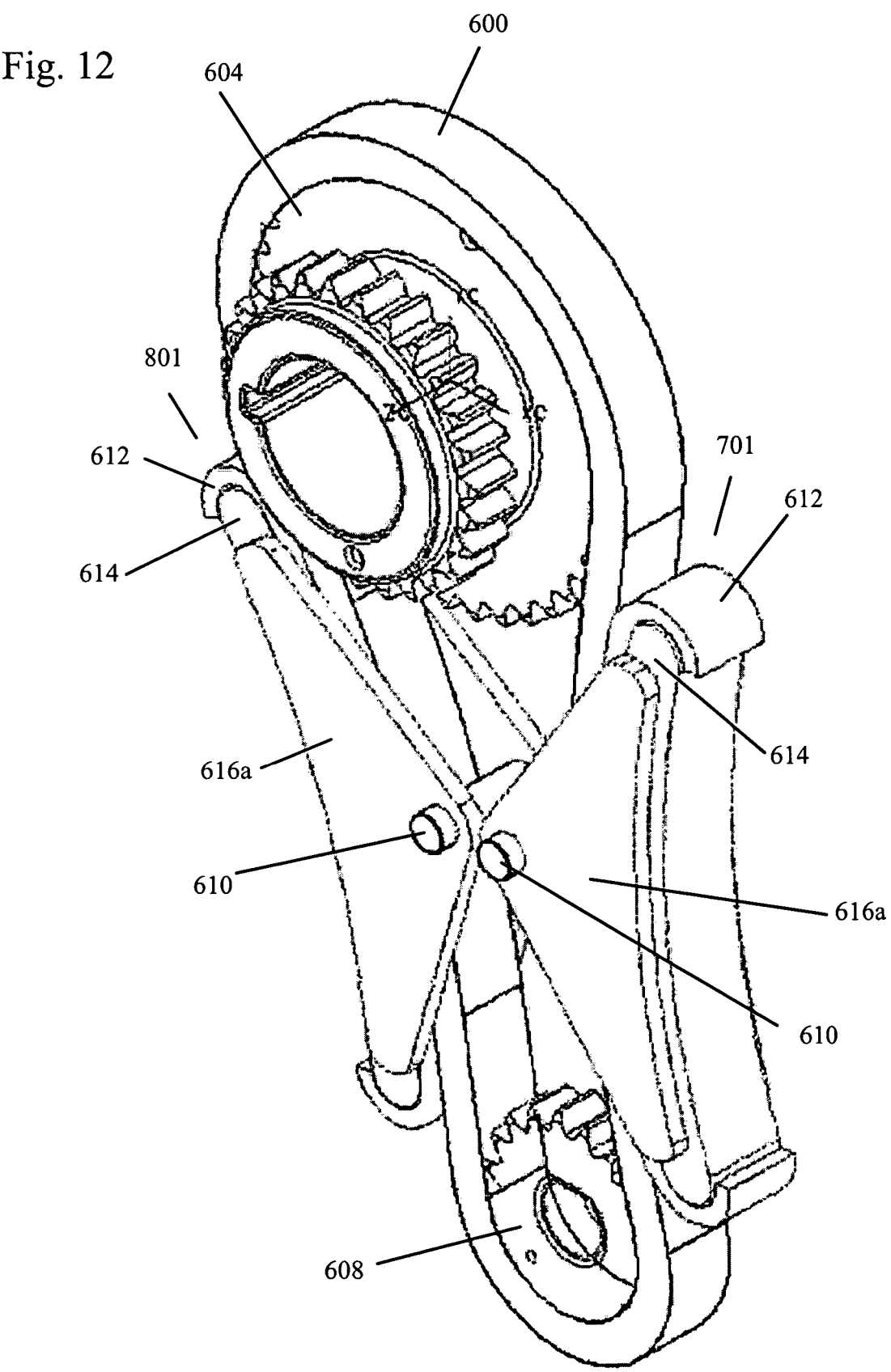
FIG. 12 shows a perspective view of the tensioner system of the second embodiment.
Figure 13:
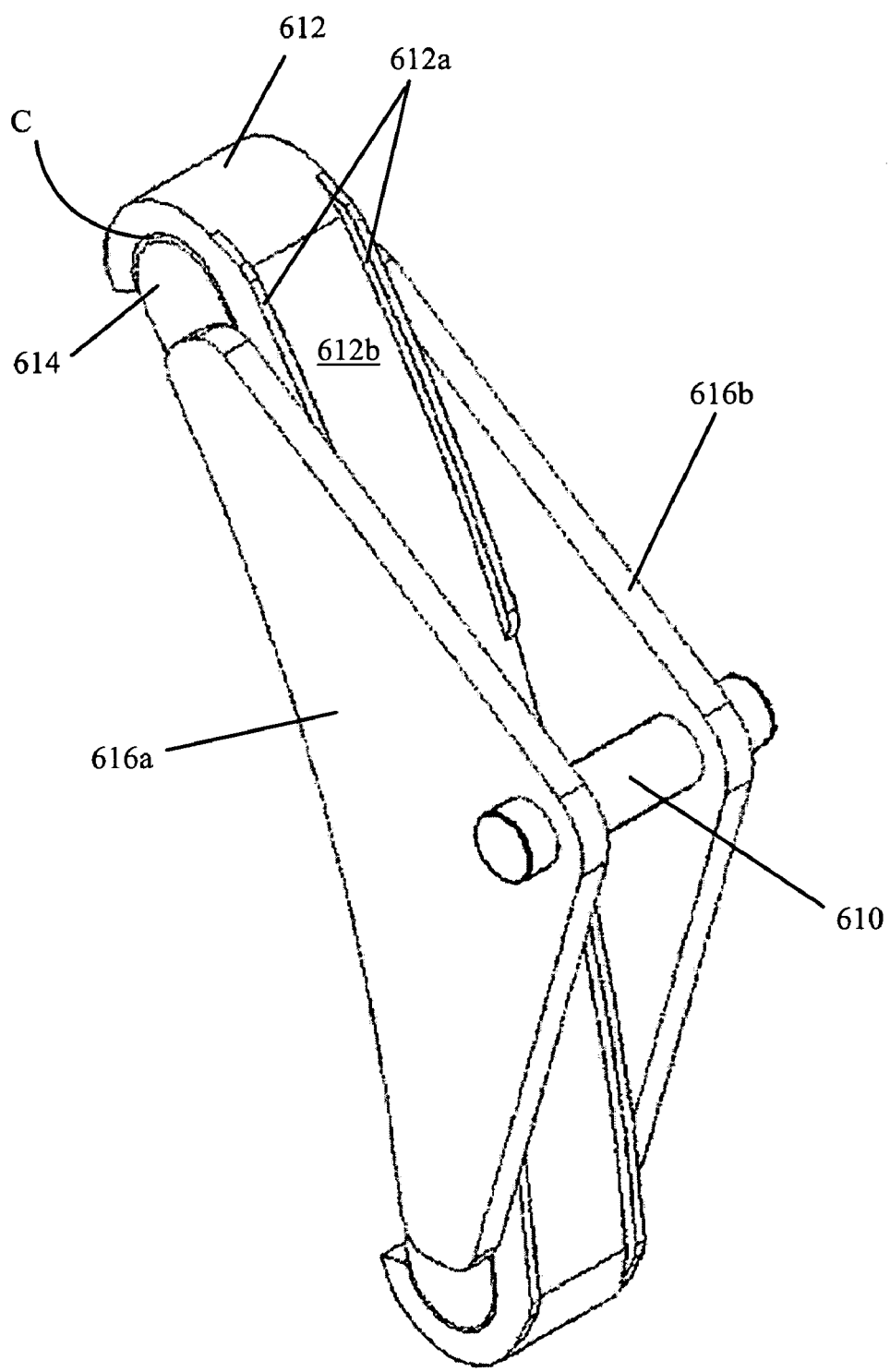
FIG. 13 shows a perspective view of the tensioning device.
Figure 14:
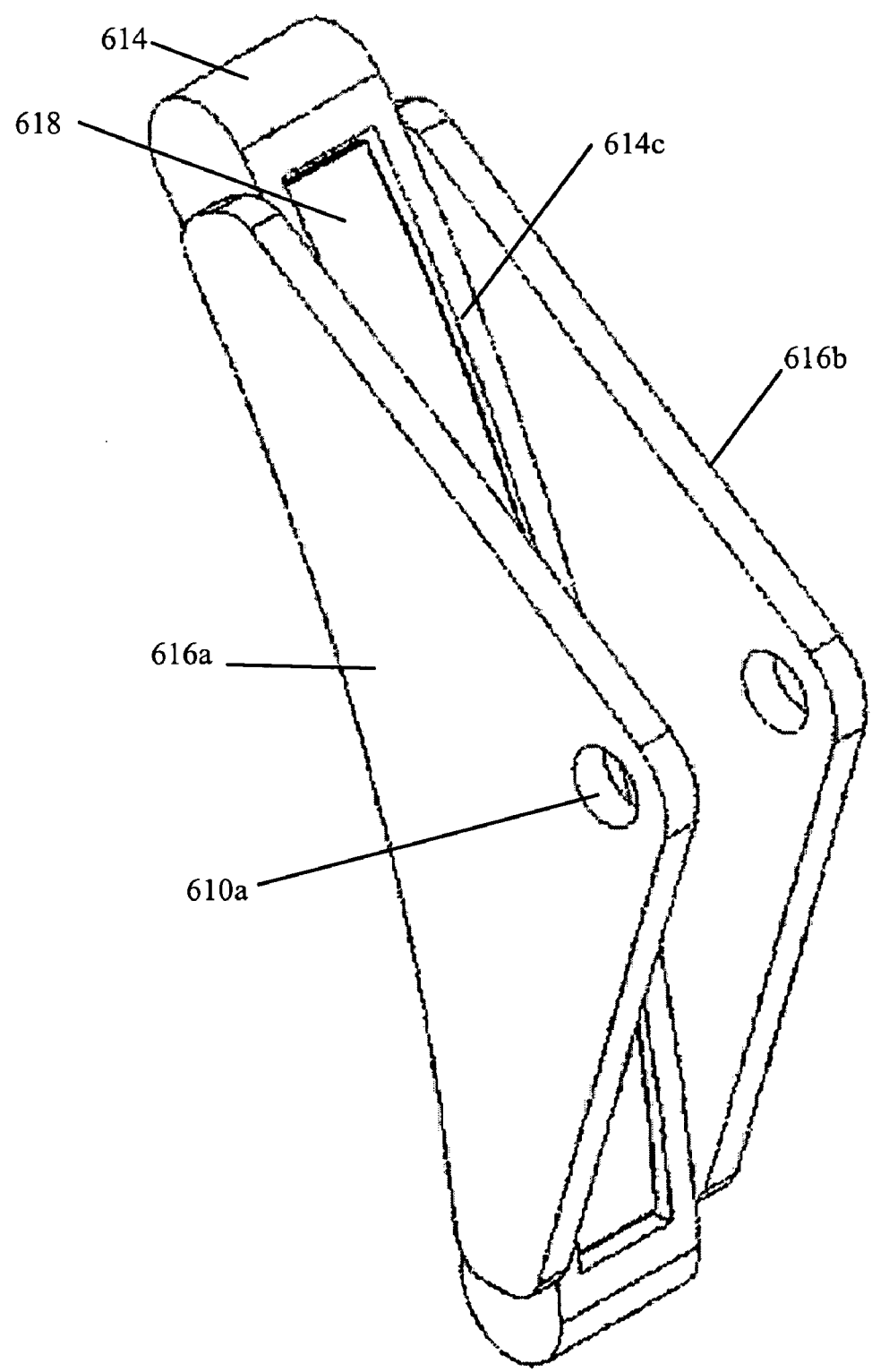
FIG. 14 shows a perspective view of the tensioning device with the chain guide element removed.
Figure 15:
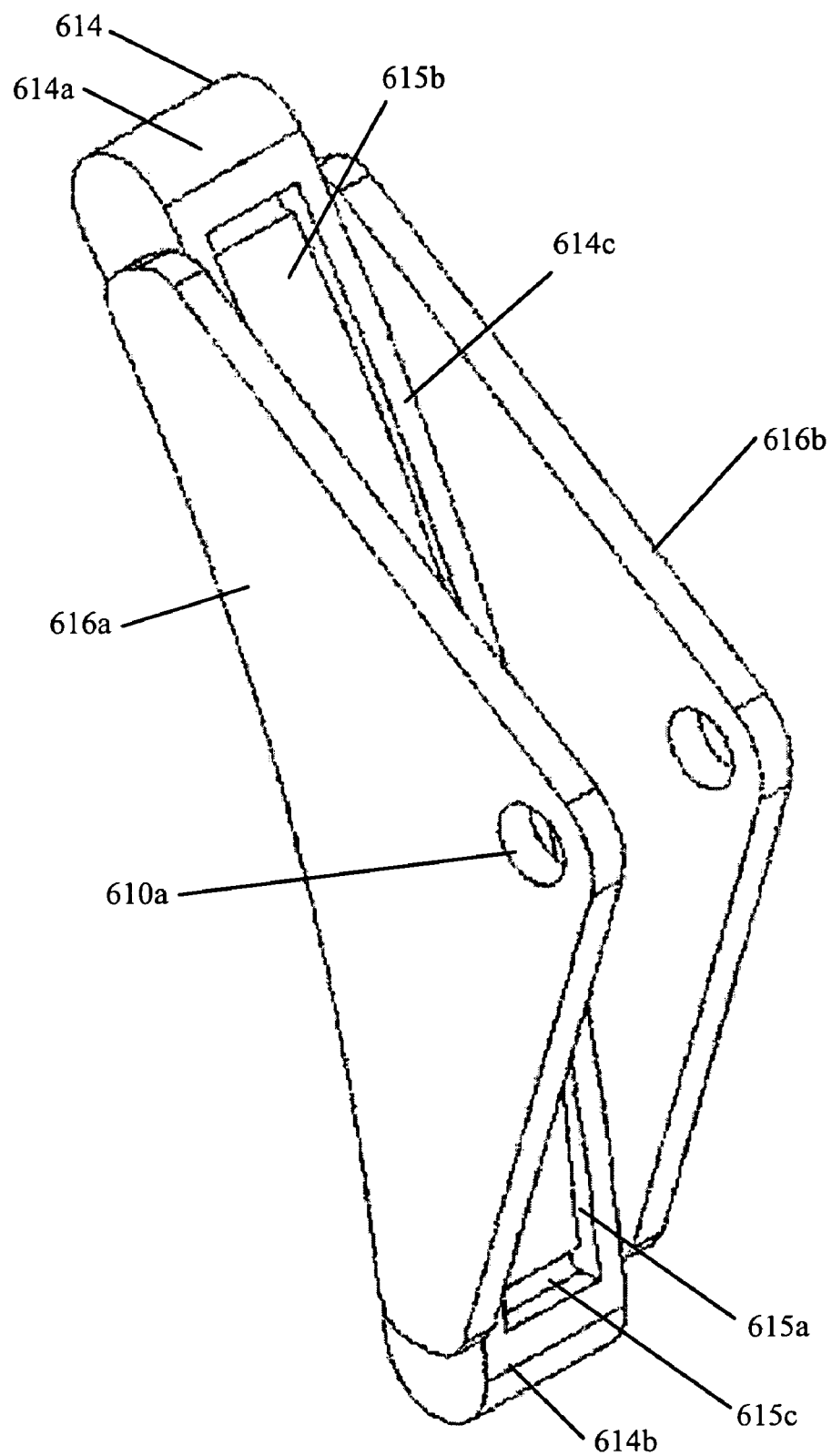
FIG. 15 shows a perspective view of the tensioning device with the chain guide element and blade spring removed.
Figure 16:
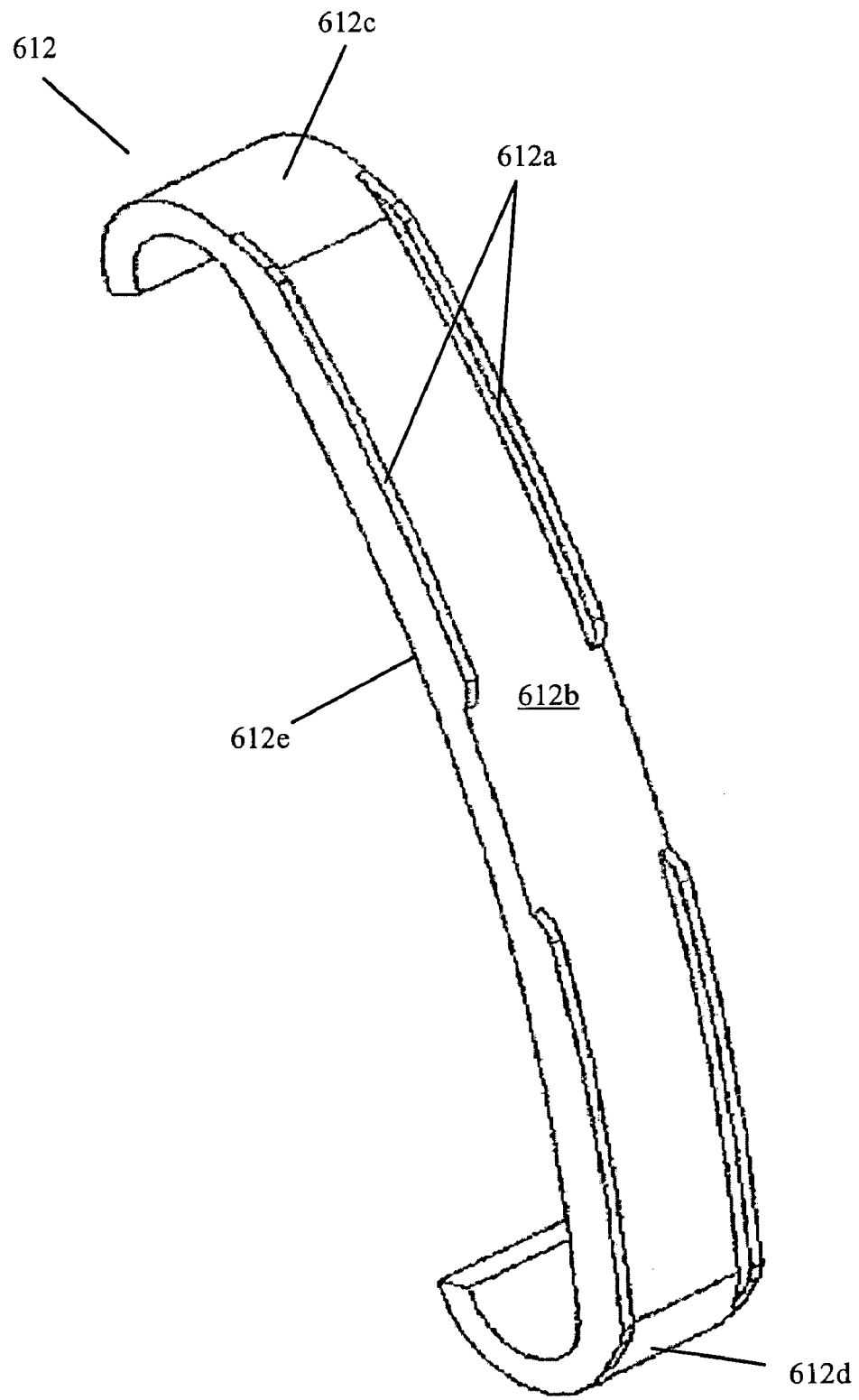
FIG. 16 shows a perspective view of the chain guide element.

FIGS. 11 and 12 show the second embodiment of the present invention. FIG. 11 shows a front view of a chain tensioning system. FIG. 12 shows a perspective view of the chain tensioning system.

A chain 600 is wrapped around a drive sprocket 608 and a driven sprocket 604 on the drive shaft 606 and the driven shaft 602 respectively. On the outside of both of the chain strands, slack and tight are preferably identical compliant pivoting tensioning devices 701 and 801.

The pivoting tensioning devices 701, 801 are preferably the same, positioned opposite each other along the chain 600. The 600 series of reference numbers indicating the same elements as described earlier in the application.

The pivoting tensioning devices 701, 801 are placed relative to the slack strand and the tight strand so that the strands are received between the pair of bracket faces 616a, and slide on the chain sliding faces 612b of the chain guide elements 612. The pair of brackets face plates 616a, 616b of each of the tensioning devices 701, 801 preferably have pivot pin holes

610a, equidistant from the face ends and offset from a line common to both 616a and 616b, for receiving pivot pin 610. The compliant tensioning devices 701, 801 pivot about pivot pins 610.

The bracket body 614 has a surface 614c with a gently curved profile that is similar to the path of a new chain as controlled by the chain guide element 612. A channel cut groove 615 with sides 615a, a bottom 615b and recessed pockets 615c at either end of the groove 615 is found longitudinally along the length of the surface 614c. At least one blade spring 618, is somewhat flattened and placed in the channel cut groove 615. The blade spring 618 is a rectangle curled lengthwise in its free state and applied mostly uncurled in its assembled state, in the channel cut groove 615, between the bracket body 614 and the chain guide element 612. The recessed pockets 615c at either end of the groove 615 act as containment means and bearing surfaces for the blade spring ends as the blade spring 618 tries to curl into its free state. The blade spring 618 applies a separating force to the underside 612e of chain guide element 612 as the blade spring 618 tries to curl into its free state, forcing the chain guide element 612 out and away from the bracket body 614 and towards the chain 600, forcing the chain guide element 612 to constantly be in contact with the chain strand. The surface 614c of the bracket body 614 acts as a stop for the chain guide element 612 in opposition to excessive chain force. Bracket face plates 616a, 616b are present on either side of the bracket body 614 to aid in maintaining the chain guide element 612 in the "Z" direction when in its extended state, such as with a worn chain. The bracket face plates 616a, 616b are preferably fixedly attached to the bracket body 614, but may be integral to bracket body 614 also. The spring load of the blade springs 618, 718 is preferably the same.

The chain guide element 612 has a first end 612c and second end 612d joined together by a middle portion that acts as the chain sliding face 612b. The chain sliding face 612b is in sliding contact with the chain 600. Along the chain sliding face 612b of the chain guide element 612 are guides 612a on either side of the face to aid in guiding the chain 600 along the face 612b. The first end 612c and the second end 612d of the chain guide element 612 are curved underneath and around towards the center of the face. The chain guide element 612 is larger than the bracket body and the curved first end 612c and second end 612d of the chain guide element 612 receive the respective first end 614a and second end 614b of the bracket body 614, loosely securing the chain guide element 612 to the bracket body 614. The chain guide element 612 is preferably made of a material that is semi-flexible at a temperature, allowing the chain guide element 612 to conform to the chain 600 and the blade spring 618. A clearance C is present between the first and second end 612c, 612d of the chain guide element 612 and the first and second end 614a, 614b of the bracket body 614. As the blade spring 618 biases the chain guide element 612 out and away from the bracket body 614, the clearance C between the ends 614a, 614b of the bracket body 614 and the ends 612c, 612d of the chain guide element 612 is taken up until the chain guide element 612 can not bow out any further.

Again, in a typical prior art chain drive system a closed loop chain with a slack strand and a tight strand encircles a driving sprocket and a driven sprocket with a distance between the two sprockets. Each of the sprockets accelerates and decelerates independent of each other as part of the internal combustion timing system, while maintaining forward motion. A rigidly fixed guide is usually located on the tight strand of the chain and a tensioner that is at least semi-rigidly fixed is located opposite the fixed guide on the slack strand.

When the driving sprocket accelerates or the driven sprocket decelerates, an energy wave is created in the spanning strand emanating from the sprocket with the decrease in velocity that moves towards the other sprocket. The chain attempts to span the distance between the link of the chain meshed with the initiating sprocket of the energy wave to the other sprocket in the shortest distance possible, a straight line. The energy moves through the free strand of the chain one link at a time until it meets the end of the guide or the tensioner, which is impacted by this energy wave and is forced to absorb it by the end pivoting end away from the strand while the other end pivots into the strand balancing the load over the length of the tensioner.

The compliant tensioning devices 701, 801 pivot about pivot pins 610, 710 in response to chain wave energy. Specifically, the pivot allows the chain guide element end 612c, 612d experiencing the chain wave energy loading to yield by pivoting away from the load until the load is balanced by a similar load on the other end as in the first embodiment.

Alternatively, when two tensioners 701, 801 are present, as in the second embodiment, the spring rate of the blade springs may be different. In one example, to tension the chain slack on one side (the slack side) only, the chain guide element 612 on the tight strand would normally be against the stop 614c of the bracket body 614. In the event of a load reversal due to torsionals or the reverse rotation that can occur at stopping of an internal combustion engine, the slack and tight strands are reversed and the tensioner on the tight strand would respond by tensioning the slack and preventing the bunching of the chain at the driven sprocket that contributes to tooth jumping as normal chain rotation is resumed. Furthermore, the tensioner on the tight strand of the chain pivots away from end loading due to chain wave energy until the load is balanced by a similar end loading on the other end of the tensioner. The possibly weaker spring on the tight strand also softens the impact when the chain again resumes its normal tight path and chain guide element 612 reseats on bracket body 614

In another example, to tension the chain slack on both strands equally, the blade spring 618 of the tight strand is a slightly high spring rate or equal, but spring rates on both sides are increased to overcome the reversal forces of the driven sprocket and to provide off stop 614c tensioning to both strands.

Figure 19:
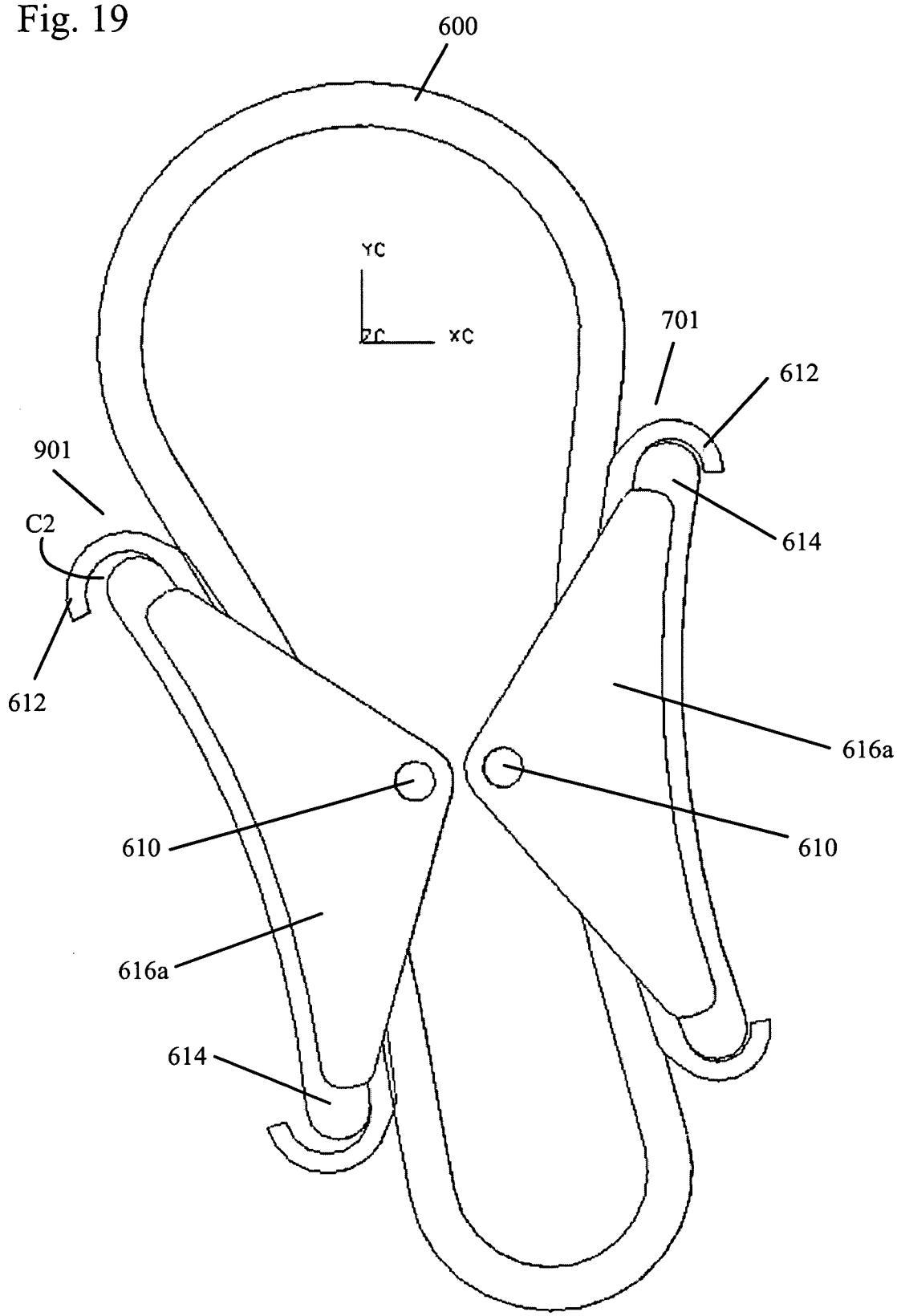
FIG. 19 shows a front view of the tensioner system of the third embodiment.

FIG. 19 shows a tensioning system with a compliant tensioning device 901 of a third embodiment in comparison to the complaint tensioning device 701 of the first embodiment.

The compliant tensioning device 901 of the third embodiment includes a larger clearance C2 between the bracket body 614 and the chain guide element 612 than in the compliant tensioning device 701 of the first embodiment. This increased clearance C2 may be obtained by decreasing the size of the bracket body 614 or alternatively increasing the radius of curvature of the ends 612c, 612d of the chain guide element 612. By having the larger clearance, the compliant tensioning device 901 has increased tensioning capabilities in comparison to the compliant tensioning device of the other embodiments.

The compliant tensioning device 901 may be present on the slack side of the chain similar to the first embodiment or on both sides of the chain as shown in the second embodiment. When two compliant tensioning devices are present as in the second embodiment, or a combination of a tensioner from the first embodiment and the third embodiment, one on each strand of the chain, the spring rate of the blade springs is preferably different. For example, one of the compliant tensioning devices may have a higher spring load and the other compliant tensioning device may have a low spring load.

In an alternative embodiment, two compliant pivoting tensioning devices, for example devices 701 and 801 of the second embodiment, may share a common pivot pin. The pair of bracket face plates 616*a* and 616*b* of the first pivoting tensioning device 701 would be offset forward or back and the pair of bracket face plates 616*a* and 616*b* of the second pivoting tensioning device 801 would be offset forwards or back relative to the pair of face plates of the first tensioning device such that the pivot pin holes 610*a* line up and a single common pivot pin 610 may be used.

Alternatively, a single bracket face plate may be used instead of a pair of bracket face plates. However, with the single bracket face plate, the load on the plate may cause twisting to occur in the Z direction.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A tensioner for imparting tension to a chain comprising:
    a body with a surface having a profile of a path of a new chain and a groove found longitudinally along a length of the surface, the groove having a containment means at each end;
    a resilient chain guide element on the surface of the body, having a chain contact surface and two ends wrapped around the ends of the body, being sufficiently larger than the body, such that the chain contact surface is capable of being pushed out;
    at least one blade spring in the groove of the body with ends in the containment means, pushing the resilient chain guide element out and away from the body; and
    at least one bracket fixedly attached to the body having a pivot.

2. The tensioner of claim 1, further comprising a clearance between the ends of the resilient chain guide element and the ends of the body.

3. A tensioning system for imparting tension to a chain having a slack strand and a tight strand comprising:
    a first tensioner on the slack side of the chain having:
        a body with a surface having a profile of a path of a new chain and a groove found longitudinally along a length of the surface, the groove having a containment means at each end;
        a resilient chain guide element on the surface of the body, having a chain contact surface and two ends wrapped around the ends of the body, being sufficiently larger than the body, such that the chain contact surface is capable of being pushed out;
        at least one blade spring in the groove of the body with ends in the containment means, pushing the resilient chain guide element out and away from the body; and
        at least one bracket fixedly attached to the body having a pivot
    a second tensioner located on the tight strand of the chain having:
        a body with a surface having a profile of a path of a new chain and a groove found longitudinally along a length of the surface, the groove having a containment means at each end;
        a resilient chain guide element on the surface of the body, having a chain contact surface and two ends wrapped around the ends of the body, being sufficiently larger than the body, such that the chain contact surface is capable of being pushed out;
        at least one blade spring in the groove of the body with ends in the containment means, pushing the resilient chain guide element out and away from the body; and
        at least one bracket fixedly attached to the body having a pivot.

4. The tensioning system of claim 3, wherein the at least one blade spring of the first tensioner has a different spring rate then the at least one blade spring of the second tensioner.

5. The tensioning system of claim 3, further comprising a first clearance between the ends of the resilient chain guide element and the ends of the body of the first tensioner and a second clearance, between the ends of the resilient chain guide element and the ends of the of the body of the second tensioner.

6. The tensioning system of claim 5, wherein the first clearance is larger than the second clearance.

* * * * *